(12) United States Patent
Marginean et al.

(10) Patent No.: US 12,499,064 B2
(45) Date of Patent: Dec. 16, 2025

(54) SYSTEM AND METHOD TO FACILITATE ACCESS BY A REMOTE COMPUTER TO A PCIe CONFIGURATION SPACE

(71) Applicant: NXP USA, Inc., Austin, TX (US)

(72) Inventors: Alexandru Marginean, Meilen (CH); Prabhjot Singh, Noida (IN); Mohit Satsangi, New Delhi (IN); Amit Rao, Austin, TX (US); Nutan Kishor Shivhare, Gwalior (IN); Robert Freddie Linn-Moran, Largs (GB)

(73) Assignee: NXP USA, Inc., Austin, TX (US)

( * ) Notice: Subject to any disclaimer, the term of this patent is extended or adjusted under 35 U.S.C. 154(b) by 191 days.

(21) Appl. No.: 18/470,051

(22) Filed: Sep. 19, 2023

(65) Prior Publication Data
US 2025/0036577 A1 Jan. 30, 2025

(30) Foreign Application Priority Data
Jul. 29, 2023 (IN) .............................. 202341051118

(51) Int. Cl.
*G06F 13/12* (2006.01)
(52) U.S. Cl.
CPC .... *G06F 13/126* (2013.01); *G06F 2213/0026* (2013.01)
(58) Field of Classification Search
CPC ................. G06F 13/126; G06F 13/385; G06F 2213/0026
See application file for complete search history.

(56) References Cited

U.S. PATENT DOCUMENTS

| | | |
|---|---|---|
| 7,478,178 B2 | 1/2009 | Torudbakken et al. |
| 8,223,745 B2 | 7/2012 | Johnsen et al. |
| 8,806,098 B1 | 8/2014 | Mandapuram et al. |
| 9,025,495 B1 | 5/2015 | Brown et al. |
| 9,690,739 B2 | 6/2017 | Shao et al. |
| 9,753,880 B1 | 9/2017 | Sodke et al. |

(Continued)

OTHER PUBLICATIONS

Markussen et al., "Flexible Device Sharing in PCIe Clusters using Device Lending," Downloaded from https://dl.acm.org/doi/pdf/10.1145/3229710.3229759 Jul. 28, 2023, 10 pages.
(Continued)

*Primary Examiner* — Phong H Dang

(57) ABSTRACT

Facilitating access to a PCIe configuration space of a PCIe function associated with a computer comprises receiving by a PCIe controller EP in the computer over a PCIe link a configuration request from a remote computer to access a PCIe configuration space. The PCIe controller then communicates over a communication fabric the configuration request to a dispatcher of the computer. The dispatcher determines from the configuration request, a PCIe function and operation indicated in the configuration request which is used to identify a respective subsystem to execute the configuration request and the configuration request is communicated to the respective subsystem based on the identification. The subsystem then executes the configuration request to facilitate access to the PCIe configuration space of the PCIe function by the remote computer and sharing of the PCIe function with the remote computer.

22 Claims, 7 Drawing Sheets

(56) References Cited

U.S. PATENT DOCUMENTS

| | | | |
|---|---|---|---|
| 9,804,988 B1* | 10/2017 | Ayoub | G06F 13/4022 |
| 10,095,645 B2 | 10/2018 | Davis et al. | |
| 2006/0236016 A1* | 10/2006 | Tetrick | G06F 13/4027 |
| | | | 710/306 |
| 2007/0266179 A1 | 11/2007 | Chavan et al. | |
| 2012/0167085 A1* | 6/2012 | Subramaniyan | G06F 13/105 |
| | | | 718/1 |
| 2015/0149661 A1 | 5/2015 | Kanigicherla et al. | |
| 2015/0169331 A1* | 6/2015 | Nelogal | G06F 9/441 |
| | | | 710/108 |
| 2016/0098365 A1* | 4/2016 | Bshara | G06F 13/4282 |
| | | | 710/313 |
| 2016/0188513 A1 | 6/2016 | Nair | |
| 2017/0199827 A1* | 7/2017 | Sankaran | G06F 12/1081 |
| 2023/0222072 A1 | 7/2023 | Govindarajan et al. | |
| 2024/0160594 A1* | 5/2024 | Benjamini | G06F 13/4221 |

OTHER PUBLICATIONS

IDT, Integrated Device Technology, "32-Lane 8-Port PCIe® Gen3 System Interconnect Switch," IDT89H32H8G3 Product Brief, Downloaded from https://www.digikey.in/htmldatasheets/production/1411719/0/0/1/idt89h32h8g3-product-brief.html Jul. 28, 2023, 1 page.

MICROSEMI a Microchip Company, "Multi-Host Sharing of NVMe Drives and GPUs Using PCIe Fabrics," Downloaded from https://micorsemi.com, Jul. 28, 2023, 18 pages.

\* cited by examiner

CONFIGURATION REQUEST INDEX TABLE

| | | 306 READ | 308 WRITE | 310 REDIRECT |
|---|---|---|---|---|
| 302 | 304 | ACTION | ACTION | OFFSET |

| | | | | |
|---|---|---|---|---|
| PF0 SPACE | OFF 0x00 | READ ACTION | WRITE ACTION | REDIRECT OFFSET |
| | OFF 0x04 | READ ACTION | WRITE ACTION | REDIRECT OFFSET |
| | OFF 0x08 | READ ACTION | WRITE ACTION | REDIRECT OFFSET |
| | OFF 0x0C | READ ACTION | WRITE ACTION | REDIRECT OFFSET |
| ... | | | | |
| PF0 VF0 SPACE | OFF 0x00 | READ ACTION | WRITE ACTION | REDIRECT OFFSET |
| | OFF 0x04 | READ ACTION | WRITE ACTION | REDIRECT OFFSET |
| | OFF 0x08 | READ ACTION | WRITE ACTION | REDIRECT OFFSET |
| | OFF 0x0C | READ ACTION | WRITE ACTION | REDIRECT OFFSET |
| ... | | | | |
| 0xFF | | | | |
| PF1 SPACE | OFF 0x00 | READ ACTION | WRITE ACTION | REDIRECT OFFSET |
| | OFF 0x04 | READ ACTION | WRITE ACTION | REDIRECT OFFSET |
| | OFF 0x08 | READ ACTION | WRITE ACTION | REDIRECT OFFSET |
| | OFF 0x0C | READ ACTION | WRITE ACTION | REDIRECT OFFSET |
| ... | | | | |
| PF1 VF0 SPACE | OFF 0x00 | READ ACTION | WRITE ACTION | REDIRECT OFFSET |
| | OFF 0x04 | READ ACTION | WRITE ACTION | REDIRECT OFFSET |
| | OFF 0x08 | READ ACTION | WRITE ACTION | REDIRECT OFFSET |
| | OFF 0x0C | READ ACTION | WRITE ACTION | REDIRECT OFFSET |
| ... | | | | |
| 0xFF | | | | |
| PFn VFm SPACE | OFF 0x00 | READ ACTION | WRITE ACTION | REDIRECT OFFSET |
| | OFF 0x04 | READ ACTION | WRITE ACTION | REDIRECT OFFSET |
| | OFF 0x08 | READ ACTION | WRITE ACTION | REDIRECT OFFSET |
| | OFF 0x0C | READ ACTION | WRITE ACTION | REDIRECT OFFSET |
| ... | | | | |

FIG. 3

SYSTEM AND METHOD TO FACILITATE ACCESS BY A REMOTE COMPUTER TO A PCIe CONFIGURATION SPACE

CROSS-REFERENCE TO RELATED APPLICATIONS

This application claims the priority under 35 U.S.C. § 119 of India patent application No. 202341051118, filed on 29 Jul. 2023, the contents of which are incorporated by reference herein.

FIELD OF USE

The present disclosure relates generally to a computer architecture and operation and more particularly, to a system and method for dispatching PCIe (peripheral component interconnect express) configuration requests to facilitate access by a remote computer to a PCIe configuration space.

BACKGROUND

PCIe (peripheral component interconnect express) is a bus standard to connect a high speed component to a computer. The PCIe standard defines a serial point-to-point connections between a PCIe endpoint such as a network interface card (NIC), storage accelerator device and other high-performance component and the computer. The computer typically has a PCIe controller Root Complex (RC) coupled to one or multiple PCIe endpoints. PCIe can also be used for computer to computer communication, connecting two computers directly or multiple computers through PCIe switches. In such communication scenarios, the computer typically has a PCIe controller configured as a PCIe controller endpoint (EP) which facilitates communication between the PCIe controller RC of the computer and the remote computer over a direct PCIe link or through PCIe switches. Further, the PCIe controller EP facilitates communication between a PCIe endpoint in the computer which has a PCIe interface and performs one or more functions such as data storage or communication functions and the remote computer. The functions are referred to as PCIe functions.

Lending is a process of making the PCIe functions of the PCIe EP available for temporary access by the remote computer. The computer is referred to as a lender and the remote computer is referred to as the lendee. The lender provides to the lendee access to the PCIe functions. In order for the lendee to access to the PCIe functions of the lender, a configuration space of the PCIe function needs to be read from or written to by the lendee.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

FIG. 3 is an example of an index table for dispatching the configuration requests in accordance with an embodiment.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview

Embodiments disclosed herein are directed to a computer referred to as a lender arranged to dispatch a configuration request received from a remote computer referred to as a lendee to facilitate access to a configuration space of a PCIe (peripheral component interconnect express) function associated with the computer. The PCIe standard defines the configuration space which is a set of registers mapped to memory locations which device drivers of the remote computer typically read to determine the capabilities of a PCIe function associated with the computer and write to set certain parameters associated with the PCIe function prior to or while the PCIe function being shared with the lendee.

The computer has a PCIe endpoint (EP) which is a PCIe device and implements the PCIe function. The lendee sends to the lender a configuration request to access the configuration space of the PCIe function. A PCIe controller EP of the computer which is coupled to the remote computer via a PCI link facilitates access to the configuration space. The PCIe controller EP receives the configuration request from the remote computer to perform an operation such as a read or write operation to the configuration space of the PCIe function. Typically, the PCIe controller EP is only able to execute or respond to a subset of the configuration requests. To process the configuration requests received from the lendee, the PCIe controller EP receives the configuration request and communicates the configuration request to a dispatcher which is a subsystem of the lender in communication with the PCIe controller EP. The dispatcher either executes an operation indicated in the configuration request or communicates the PCIe configuration request to a subsystem of the computer such as the PCIe controller EP, the PCIe EP, or a virtualization controller which then executes the operation indicated in the configuration request. In an example, the execution includes writing to the configuration space or reading from the configuration space. The dispatcher allows the lendee to send configuration requests to the PCIe controller EP of the computer to access the configuration space of the PCIe function without needing to change a PCIe software stack of the lendee to facilitate access to the configuration space. Well known instructions, protocols, structures, and techniques have not been shown in detail in order not to obfuscate the description.

Example System

Figure 1:
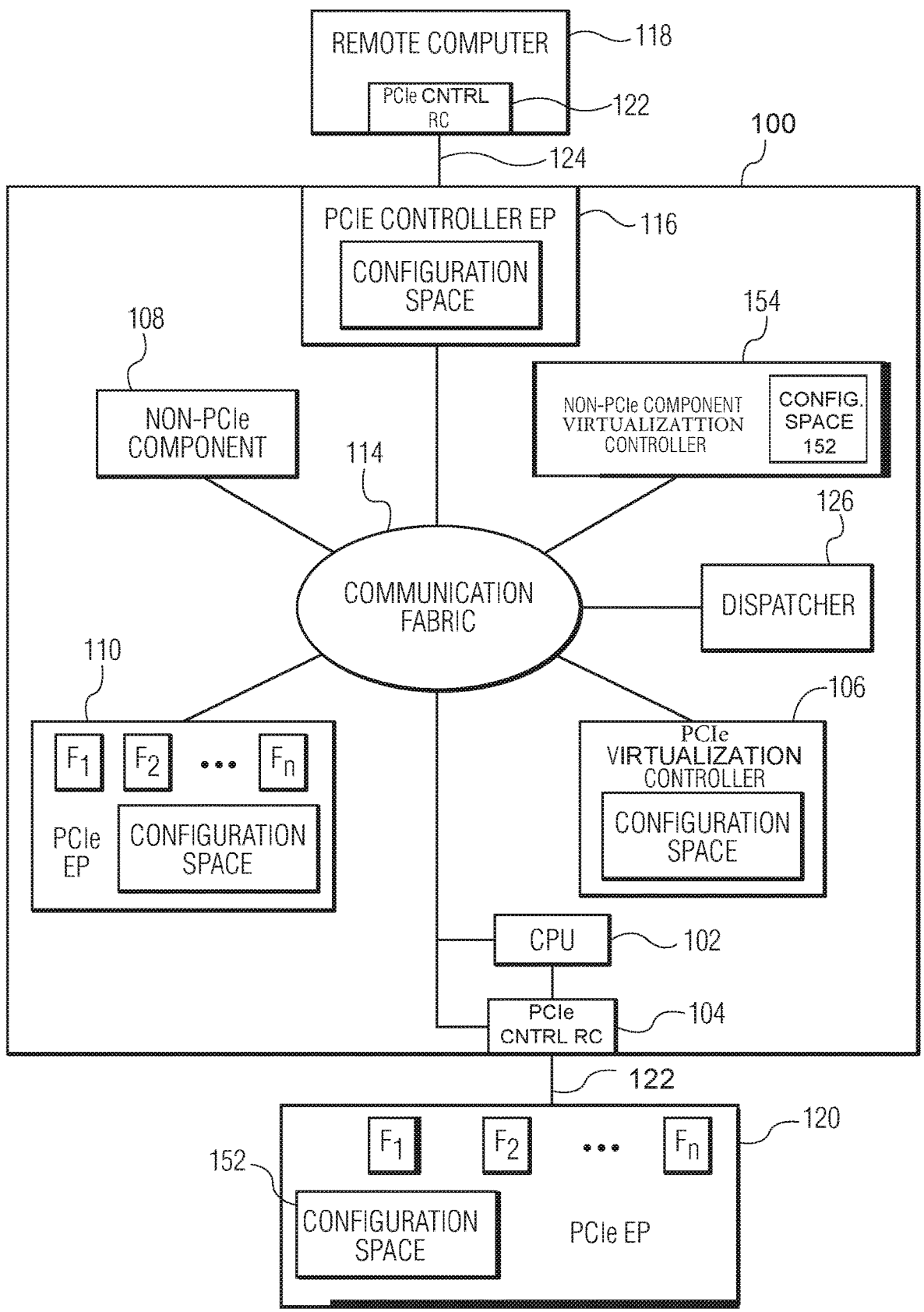
FIG. 1 is an example block diagram of a computer arranged to dispatch configuration requests to facilitate access by a remote computer to a configuration space associated with a PCIe (peripheral component interconnect express) function in accordance with an embodiment.

FIG. 1 is an example block diagram of a computer 100 arranged to dispatch configuration requests to facilitate access by a remote computer to a configuration space associated with a PCIe (peripheral component interconnect express) function in accordance with an embodiment. PCIe promulgated by the PCI-SIG consortium defines an interface to facilitate access to functionality of one or more devices such as a network interface card (NIC), storage accelerator device, and other high-performance component. The PCIe interface defines electrical and protocol for a physical layer and topology of a connection to the device to access the functionality of the device. The device which has the PCIe interface is referred to as a PCIe endpoint (EP) and the functions of the PCIe device is referred to as PCIe functions. The computer 100 and associated subsystems as described herein may be implemented with circuitry such as one or more of analog circuitry, mix signal circuitry, memory circuitry, logic circuitry, and processing circuitry that executes code stored in a memory that when executed by the processing circuitry performs the disclosed functions.

The computer 100 is an electronic system for processing data and may take the form of a system on a chip (SoC), an integrated circuit, or a combination thereof, among other forms. In an example, the computer 100 includes one or more of a central processing unit (CPU) 102, a multi-function PCIe (peripheral component interconnect express) EP 110, a PCIe controller RC 104, and a non-PCI component 108. Further, the computer 100 may be coupled to a multi-function PCIe EP 120. The CPU 102 may include logic circuitry, hardware, software, multiple processors, multiple cores, multiple nodes, and/or implementing multi-threading, etc. to perform various functions of the computer 100. The multi-function PCIe EP 110, 120 may be a PCIe device such as the network interface card (NIC), storage accelerator device, and other high-performance component which performs one or more PCIe functions. The PCIe controller root complex (RC) 104 defines an input/output (I/O) hierarchy and facilitates communication between the CPU 102 and the multi-function PCIe EP 120 over a link 122 which may include one or more of a PCIe link or PCIe switch which switches PCIe links to the PCIe RC 104. Unlike the PCIe EP 110, 120, the non-PCIe component 108 may be a device which does not implement a configuration space defined by the PCIe specification. Examples of the non-PCIe component 108 may be a controller area network (CAN) bus controller or a storage device. A communication fabric 114 may facilitate communication between one or more of the non-PCIe component controller 154, non-PCIe component 108, PCIe EP 110, 120, PCIe controller EP 116, PCIe RC 114, and CPU 102, examples of which are subsystems associated with the computer 100. In an example, the communication fabric 114 may take various forms including but not limited to a network on chip (NOC) which runs a communication bus protocol such as advanced extensible interface (AXI) to facilitate the communication between subsystems, a local bus structure to facilitate communication between subsystems, a custom interface to facilitate communication between subsystems, and combinations thereof. In an example, the communication fabric 114 may not implement a PCIe protocol for communication and not include a PCI switch.

Lending is a process of making PCIe functions of the multifunction PCIe EP 110, 120 available for temporary access by a computer remote to the computer 100. For example, a multifunction PCIe EP 110 in the form of a storage device may provide PCIe storage functions to a remote computer 118. The computer 100 is a lender of the PCIe function and the remote computer 118 is a lendee of the PCIe function. The remote computer 118 similar to the computer 100 may have a PCIe controller RC 122 which is coupled to a PCIe controller EP 116 of the computer 100 via a PCIe link 124. In an example, the PCIe controller EP 116 may facilitate communication between the computer 100 and the remote computer 118 via the PCIe link 124.

The lending process may begin with a PCIe configuration process where the lender may define one or more PCIe functions to be shared with the lendee or non-PCIe functions to be shared with the lendee as a PCIe function. A configuration space for the PCIe function may be allocated and made available to the lendee. The configuration space may be a set of registers mapped to memory locations and which device drivers of the remote computer 118 will have access to determine the capabilities and status of the PCIe function and to set certain parameters. In an example, the CPU 102 may execute software to cause the PCIe EP 110, 120 allocate the configuration space such that each respective PCIe function may have its own configuration space during an initialization process. The configuration space is typically 4K bytes long, addressable by an eight-bit PCI bus identifier which identifies a PCIe link to which the PCIe EP is coupled, a five-bit device identifier which identifies the PCIe EP, and a three-bit function identifier for the PCIe EP which identifies a function of multiple PCIe functions of the PCIe EP. The address is commonly referred to as the BDF or B/D/F, as abbreviated from bus/device ID/function. Unlike the PCIe EP 110, 120, the non-PCIe components 108 is not arranged to set up a configuration space for a function supported by the non-PCIe component 108 because it is not a PCIe device. The computer 100 may have a non-PCIe component virtualization controller 154 which may define a configuration space 152 for the function of the non-PCIe component 108 and assign a device ID or vendor ID for the non-PCIe function so that functions of the non-PCIe component 108 may be presented as PCIe functions to the remote computer 118. The non-PCIe component virtualization controller 154 may be a subsystem of the computer 100 and coupled to the communication fabric 114 to facilitate communication with the other subsystems of the computer 100.

In one example, the PCIe function may be a physical function (PF) which identifies the PCIe device as a full-featured PCIe function with dedicated resources on the PCIe device to provide the PCIe function. In another example, the PCIe function may be a combination of a physical function (PF) and associated lightweight PCIe virtual function (VF) that is defined by a single root I/O virtualization (SR-IOV) capability structure which is part of the PCIe specification and specifies a configuration of the PCIe EP that allows a PCIe function to be virtualized and appear as a PF and one or more VFs. The PF may be a PCIe function with its own physical resources. The one or more VFs are associated with the PF, and represents a virtualized instance of the PF of the PCIe EP and shares one or more physical resources with the PF. In yet another example, the PCIe function may be a standalone VF virtualized as a PF or one or more VFs virtualized as a PF and one or more VFs. The computer 100 may have a PCIe virtualization controller 106 which provides such a virtualization to allow the remote computer 118 to discover the PCIe functions associated with the standalone VF of the PCIe EP 110, 120 or VFs virtualized as a PF and one or more VFs in a SR-IOV capability structure when conventionally the PCIe only allows sharing of PCIe functions associated with a PF or PF and one or more VFs. The PCIe virtualization controller 106 may define the configuration space of the virtual functions also during the configuration process. The PCIe virtualization controller 106 may be a subsystem of the computer 100 and coupled to the communication fabric 114 to facilitate communication with the other subsystems of the computer 100.

An enumeration process associated with the configuration process may begin after the configuration spaces are defined during the PCIe configuration process. The PCIe RC 122 of the computer 100 may discover, via the PCIe controller EP 116, PCIe functions of the PCIe EP 110, 120 which the computer 100 may share with the remote computer 118. In an example, the enumeration process may include the PCIe RC 122 attempting to access a configuration space associated with a B/D/F. In an example, the computer 100 may be preconfigured during an initialization of the computer prior to the PCI configuration process to control which PCIe functions the remote computer 118 will have access to. The remote computer 118 may send a request to access the configuration space associated with the B/D/F and the PCIe controller 116 may send a response to the attempt to access the configuration space which is provided to the remote computer 118. The response may indicate to the PCIe RC 122 whether or not there is a PCIe function associated with the B/D/F which is accessible to the remote computer 118. If a null response is received such as 0xFFFF_0xFFFF, the response may indicate no PCIe function is associated with the B/D/F and the response indicates no device ID/vendor ID is associated with the PCIe function. If a non-null response is received which is not 0xFFFF_0xFFFF in an example, then the response indicates a valid indication of the PCIe function and valid device/vendor indication of the PCIe device (e.g., PCIe EP 110, 120). The PCIe function has a configuration space which is accessible to the remote computer 118. Based on the valid vendor and device indication which is received, the remote computer 118 may load a driver compatible with the PCIe function, device ID, and vendor ID to facilitate access to the PCIe function. The driver may be software on the remote computer 118 for interfacing with the PCIe function.

The PCIe controller RC 122 which receives a response to the B/D/F indicates that the computer 100 may share access to a corresponding PCIe function associated with the B/D/F.

The computer 100 may then issue to the PCIe controller EP 120 via the PCIe link 124 a configuration request generated by the PCIe controller RC 122 to configure the configuration space of the PCIe function. The configuration request may be received at the PCIe controller EP 116 and include an indication to a PCIe function (e.g., B/D/F) and an indication of an operation to execute in a configuration space of the PCIe function such as a read or write operation to enable and quiesce functions, enable and disable interrupts, and perform resets associated with the PCIe function as some examples.

Embodiments disclosed herein are directed to the computer 100 being arranged to service the PCIe configuration request issued by the remote computer 118 to facilitate access to the configuration space associated with a PCIe function of the configuration space which is shared with the remote computer 100. The PCIe controller EP 116 which receives the configuration request from the remote computer 122 may communicate the configuration request to a dispatcher 126 coupled to the communication fabric 114 which is arranged to receive the configuration request. The dispatcher 126 may be preconfigured during an initialization of the computer prior to the PCI configuration process to perform an action associated with the configuration request which is received from the remote computer 118. In an example, the pre-configuration may be to configure the dispatcher 126 with an index table (e.g., read-only) as described below which indicates the action to be performed. For instance, the configuration request may indicate a read or write operation in the configuration space associated with a PCIe function. The read operation may result in a read parameter being provided back to the remote computer 118 or a completion response to the write operation being provided back to the remote computer 118. In an example, the operation may be to read or write a base address register (BAR). The BAR may be a register in the configuration space which defines a region of a physical memory address space which is allocated for a PCIe function. In one example, the action may be for the dispatcher 126 to communicate the configuration request to the PCIe controller EP 116 based on the PCIe function and operation indicated in the configuration request. The PCIe function and operation may be associated with the PCIe link 124 and the configuration space is managed by the PCIe controller EP 116 such that the PCIe controller EP 116 may execute the operation indicated in the configuration request. In another example, the action may be for the dispatcher 126 to communicate the configuration request to the PCIe EP 110, 120 based on the PCIe function and operation indication in the configuration request. For example, the configuration request may be a request to enable or disable a message signaled interrupt (MSI) associated with a PCIe function of the PCIe EP 110, 120 which the PCIe controller EP 110, 120 may be able to enable or disable by writing in the configuration space of the PCIe function. The PCIe controller EP 110, 120 may execute the operation indicated in the configuration request. In yet another example, the action may be for the dispatcher 126 to communicate based on the PCIe function and operation indicated in the configuration request the configuration request to the non-PCIe component virtualization controller 154 which performs an action based on the configuration request. For instance, the configuration request may be associated with an operation in a field in the configuration space of the non-PCIe component 108. The PCIe configuration request may be a request to access the configuration space of the non-PCIe function 108 and the non-PCIe component virtualization controller 154 may manage the configuration space of the non-PCIe component 108 because the component is not arranged with a configuration space. The non-PCI component virtualization controller 154 may execute the operation indicated in the configuration request. In another example, the action may be for the dispatcher 126 to communicate based on the PCIe function and operation indicated in the configuration request the configuration request to the PCIe virtualization controller 106 which performs an action based on the configuration request. The configuration request may be associated with a configuration space of standalone VF virtualized as a PF or one or more VFs virtualized as a PF and one or more VFs in an SR-IOV capability structure. The PCIe virtualization controller 106 may execute the operation indicated in the configuration request.

In some examples, the dispatcher 126 may be preconfigured during an initialization process prior to the PCIe configuration process with certain parameters of the configuration space of PCIe functions if values of the parameters do not change in the configuration space, e.g., read only (RO) parameters. Then, based on certain operations such as a read operation to a configuration space indicated by the configuration request from the remote computer 118 and based on the PCIe function indicated, the action may be for the dispatcher 126 to execute the operation indicated in the configuration request rather than communicating the configuration request to another subsystem of the computer 110 to execute the operation. For example, the operation may be to read a parameter in the configuration space and provide a value of the parameter back to the remote computer 118. Because the dispatcher is already configured with a value of the parameter, the dispatcher 126 may communicate this parameter via the communication fabric 114 and the PCIe link 124 to the remote computer 118 rather than dispatching the configuration request to another subsystem for execution.

In examples, the dispatcher 126 allows the remote computer 118 to issue configuration requests with an indication of the PCIe function to be configured and operation to be executed in the configuration space of the PCIe function which are then communicated to relevant subsystems in the computer 100. The dispatcher 126 avoids limiting the computer 100 from being be able to only execute PCIe configuration requests which are read operations of read only values in a configuration space. The dispatcher 126 also avoids a need to change a conventional PCIe software stack of the remote computer 100 to enable the remote computer 118 to communicate with PCIe functions of the computer 100.

Figure 2:
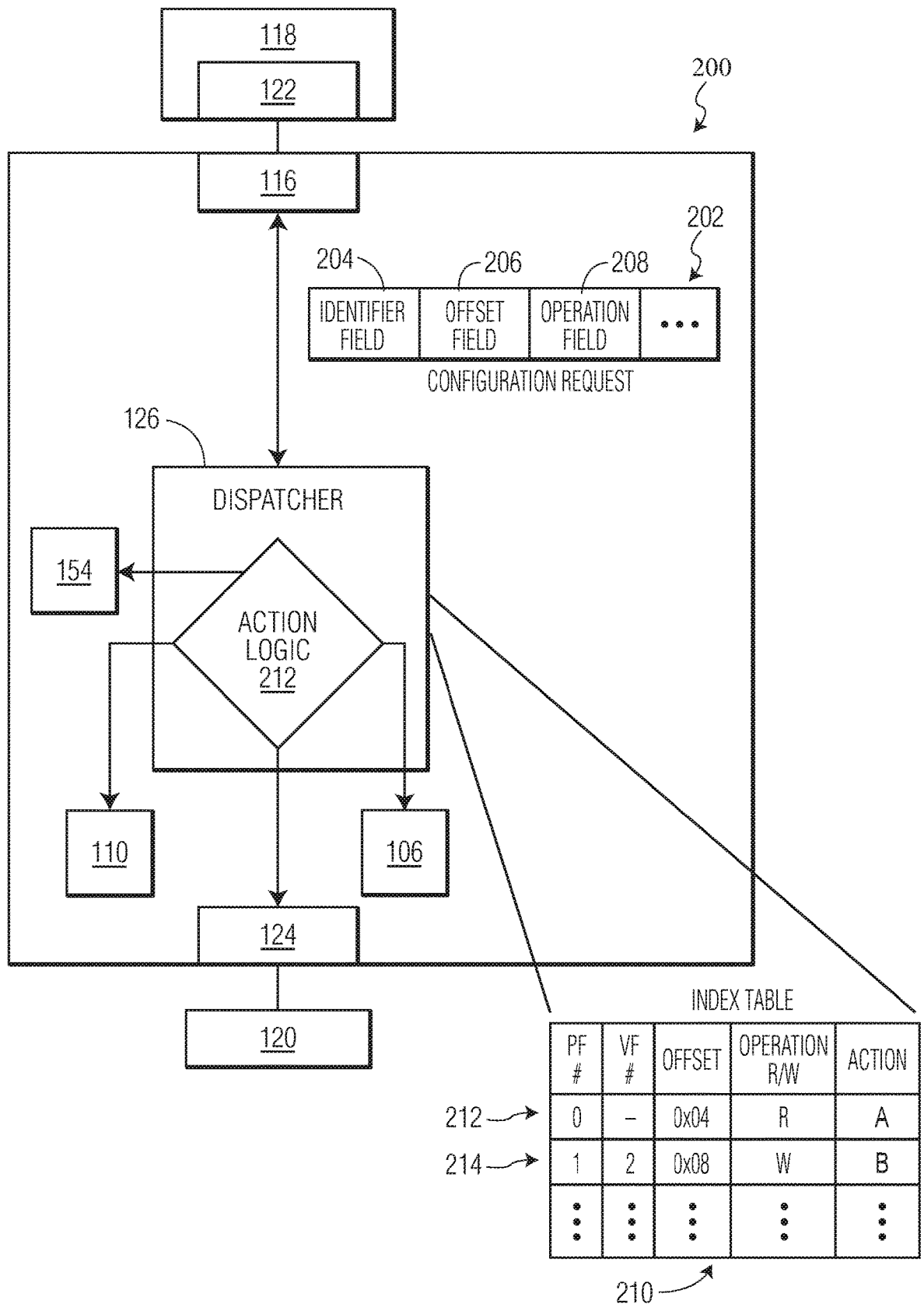
FIG. 2 is an example block diagram which illustrates operations of a dispatcher in accordance with an embodiment.

FIG. 2 is an example block diagram 200 which illustrates operations of the dispatcher 126 in accordance with an embodiment. The PCIe controller EP 116 may receive a PCIe configuration request 202 which is ingress from the PCIe link 124 to the PCIe controller EP 116 from the remote computer 118. The configuration request 202 includes a plurality of fields 204-208. The fields may include the identification field 204 which indicates a PCIe function. An offset field 206 may indicate an offset into a configuration space associated with the PCIe function to identify certain parameters in the configuration space and an operation field 208 may indicate an operation to be executed in the configuration space at the offset.

In one example, the indication of PCIe function in the identification field 204 may be an indication of a PF. In another example, the indication in the identification field 204 may be an indication of an VF of a PF in an SR-IOV capability structure. In yet another example, the indication in the identification field 204 may be an indication of a VF virtualized as a PF. In another example, the indication in the identification field 204 may be an indication of a VF associated with a VF virtualized as a PF in an SR-IOV capability structure. The offset 206 in the PCIe configuration request 202 may identify the configuration parameters of the PF, virtualized PF, or VF in its configuration space as an example. The offset 206 may be a memory offset within the configuration space. The operation field 208 may then indicate what operation to execute at the offset 206. For example, the operation indicated in the operation field 208 may be a read (R) or write (W) in the configuration space of the PCIe function at the offset.

The PCIe controller EP 116 may provide the configuration request 202 which is received from the remote computer 118 to the communication fabric 114 to facilitate communicating the configuration request 202 to the dispatcher 126. In an example, the PCIe controller EP 116 may add an indication to the configuration request which allows for providing the configuration request to the dispatcher 126 over the communication fabric 114 based on the indication. In an example, the indication may allow the dispatcher 126 to identify that the configuration request is to be received by the dispatcher 126. The indication may be a transaction identification which identifies the communication is a configuration request or an address of the dispatcher as examples which is appended to the configuration request.

The dispatcher 126 may have an example index table 210 which the dispatcher 126 uses to determine an action to perform based on the indication in the identification field 204, offset field 206, and operation field 208 in the PCIe configuration request 202. The table 210 may be used to map the indication in the identification field 204, the offset in the offset field 206 of the configuration request 202 and whether the operation 208 is a read or write operation to a row of the table 210 which indicates an action in the same row of the table 210. For example, if the identification field 204 indicates a configuration request for PF=0 which is not associated with an SR-IOV capability structure and the operation indicated in the operation field 208 is a read operation, then row 212 of the index table 210 may be accessed which indicates to communicate the configuration request to subsystem A (e.g., non-PCIe component controller 154, PCIe EP 110, 120, PCIe controller EP 116, virtualization controller 106) to perform the read operation at offset 0x04 in the configuration space. As another example, if the identification field 204 indicates a configuration request for PF=1 and VF=2 associated with an SR-IOV capability structure and the operation indicated in the operation field 208 is a write operation, then row 214 of the index table 210 may be accessed which further indicates to communicate the configuration request to subsystem B (e.g., non-PCIe component controller 154, PCIe EP 110, 120, PCIe controller EP 116, virtualization controller 106) to perform the write operation at offset 0x08 in the configuration space. The dispatcher 126 may then add an indication to the configuration request which allows the subsystem to where the configuration request is to be communicated to identify and receive the configuration request from the dispatcher 126 via the communication fabric 114.

To further illustrate in an example, the PCIe EP 116 may receive a configuration request from the remote computer 118. The PCIe EP 116 may communicate the configuration request to the dispatcher 126 via the communication fabric 114. The dispatcher 126 may receive the configuration request from the communication fabric 114 and perform a table lookup in the index table 210 to determine which action to perform. The dispatcher 126 may perform the action in action logic 212. In one example, the table 210 may indicate the action is to communicate the configuration request to the PCIe controller EP 116 to execute a write operation which relates to the configuration space of the PCIe link 124 between the PCIe controller EP 116 and the PCIe controller RC 122. In another example, the table 210 may indicate the action is to communicate the configuration request to the PCIe EP 110, 120 to execute a write operation which relates to the configuration space of a PCIe function of the PCIe EP 110, 120. In yet another example, the table 210 may indicate the action is to communicate the configuration request to the non-PCIe component virtualization controller 154 and the configuration request is communicated to the non-PCIe component virtualization controller 154 to execute a read or write operation which relates to the configuration space of a PCIe function of the non-PCIe component 108. In another example, the table 210 may indicate the action is to communicate the configuration request to the PCIe virtualization controller 106 and the configuration request is communicated to the PCIe virtualization controller 106 to execute a read or write operation which relates to the configuration space of a PCIe function of the virtualized PCIe function. In an example, the dispatcher 126 is not a PCIe switch because the dispatcher 126 communicates the configuration request to a particular subsystem based on the determined PCIe function indication and an operation indication indicated in the configuration request rather than other criteria.

In some examples, the table 210 may indicate the action is to be performed by the dispatcher 126 which relates to a read operation of a configuration space of a PCIe function of the PCIe EP 110, 120 and the dispatcher 126 executes the operation because the dispatcher 126 may be preconfigured with the value of the parameter of the configuration space to be read. In an example, the dispatcher 126 is not a PCIe switch because the dispatcher 126 executes the configuration request.

In an example, a response to the execution of the configuration request may be provided back to the PCIe EP 116 via the communication fabric 114. The PCIe EP 116 receives the response and then forwards the response to the configuration request to the remote computer 118 via the PCIe link 124. The response may be an indication that a write configuration request was performed or a value of a parameter in a configuration space requested in a read configuration request.

FIG. 3 is a detailed example of the table 300 in accordance with an embodiment. The table 300 which is stored in a memory accessible to the dispatcher 116 may include a plurality of columns, including a column 302 which identifies a PCIe function and column 304 which indicates offsets in a configuration space associated with a physical function. The table 300 also includes an action associated with a write operation or read operation in columns 306 and 308 and a column 310 which indicates a redirect offset.

In an example, the identification 204 in the configuration request 202 may identify one of the PCIe functions in the column 302. For instance, the PCIe function may be indicated in terms of a physical function 0 (PF0) as shown in row 312 or a virtual function 0 (VF0) of PF0 as shown in row 314. An offset in the column 304 may indicate a location in the configuration space of a PF/VF for which the remote computer 118 requests to execute an operation and which is indicated in the configuration request 202. For example, the configuration space at offset 0x04 may be accessed for PCI function PF0 as shown in sub-row 316 when the configuration request 202 identifies the offset 0x04 in the offset field 206. The column 306 may indicate an action to be performed for a read operation of the PCIe function and the column 308 may indicate an action to be performed for a write operation of the PCIe function. For example, the sub-row 316 may indicate an action for a write operation and an action for a read operation depending on whether the configuration request indicates for a write operation or read operation to be executed in the configuration space offset 0x04. The action may be to dispatch the configuration request to a particular subsystem for execution or for the dispatcher 126 to execute the operation.

In some examples, the redirect offset in column 310 may be set to indicate that another location in the configuration space is to be accessed other than at the offset indicated by column 304. The redirect offset may be a correction to the offset 304 that is provided in the configuration request. For example, an organization of the configuration space may be changed by the virtualization controller 106 from a conventional arrangement such that a parameter normally at a particular offset in the configuration space is moved to a different offset in the configuration space. The redirect offset may indicate the new offset of the parameter which the dispatcher 116 then indicates to access the parameter rather than having to inform the remote computer 118 of the new offset for the parameter and the remote computer 118 having to keep track of or be informed of this new offset. In an example, the indication of offset in the offset field 206 may be replaced with an indication of the redirect offset and the dispatcher 126 may then communicate the configuration request with the updated offset to the subsystem which will execute the configuration request based on the indicated redirect offset or for the dispatcher 126 to execute the configuration request.

In some examples, the table 300 may be arranged such that a configuration space associated with different VFs with a same PF may have same entries and only one instance of the offset, action, and redirect offset is stored to save storage space and not have to store duplicate entries for different VFs associated with a same PF. This is illustrated in row 318 where a bit sequence or flag shown as 0xFF in column 302 as an example in the table 300 might indicate that PCIe functions for PF0 and VF1 . . . m where m is an integer have the same entries as PF0 VF0. In some examples, the entries may not be included in the table 300.

A configuration space of a PCIe function may be arranged based on whether a VF is shared as a standalone PCIe function (without an SR-IOV capability structure) or with an SR-IOV capability structure with the remote computer 118. The dispatcher 126 may direct a configuration request associated with the configuration space to the PCIe virtualization controller 106.

Figure 4:
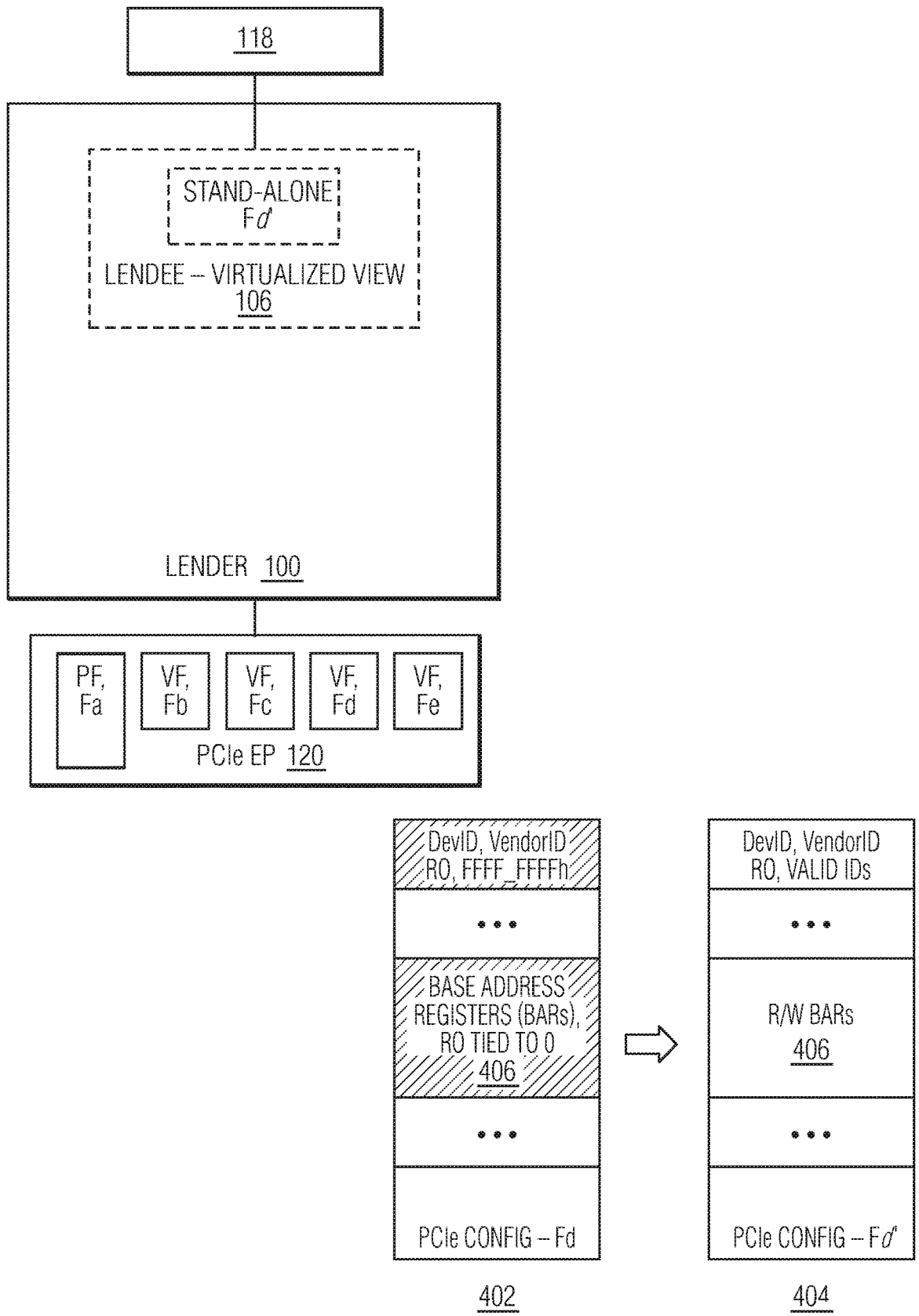
FIG. 4 illustrates an example of sharing a PCIe function in accordance with an embodiment.

FIG. 4 illustrates an example of sharing a PCIe function in accordance with an embodiment. In the example, available functions of the PCIe EP 120 are shown as Fa to Fe. The PCIe EP 120 may be a multifunction PCIe device which implements an SR-IOV capability structure, where Fa is a PF and 4 VFs (Fb-Fe) are associated with the PF Fa. In an example, the remote computer 118 may be provided access to a single PCIe Function Fd' implemented by the PCIe EP 120. This PCIe function is presented as a stand-alone PCIe Function (without an SR-IOV capability structure) by the PCIe virtualization controller 106 to the remote computer 118 during the enumeration process as a virtualized PF while other PCIe functions of the PCIe EP 110, 120 are reserved for other users. The virtualized view as presented to the remote computer 118 is one function Fd', presented as stand-alone function, decoupled from the PCIe EP PF (Fa). The standalone function may be a virtualized PF. As part of this virtualization, the virtualization controller 106 may reconfigure a configuration space 402 of the PCIe function Fd which is a VF in the SR-IOV capability structure to a configuration space 404 associated with Fd' which is a standalone virtualized view of a PF. The reconfiguration may be performed when the computer 100 is configured to share the PCIe function with the remote computer 118. In an example, device ID, vendor ID for Fd are read only (RO) and FFFF_FFFFh in the configuration space 402 per the PCIe specification for VFs. The PCIe virtualization controller 106 may convert one or more of a device ID, vendor ID to a valid combination of IDs in Fd', based on the device ID and vendor ID in the PF SR-IOV capability structure or explicit configuration. Further, base address registers (BARs) 406 for Fd are RO and tied to 0 per the PCIe standard for VFs in the configuration space 402. Values are instead defined by the PF SR-IOV capability structure. Based on this indication, BARs are converted to functional R/W registers in the configuration space 404, allowing the remote computer 118 to discover address regions associated with the PCIe function. The PCIe virtualization controller 106 may maintain this updated configuration space 404 and in this way, when the PCIe virtualization controller 106 receives a configuration request associated with the PCIe function Fd', the PCIe virtualization controller 106 may execute the read or write operation in the configuration space 404 associated with the PCIe function.

Figure 5:
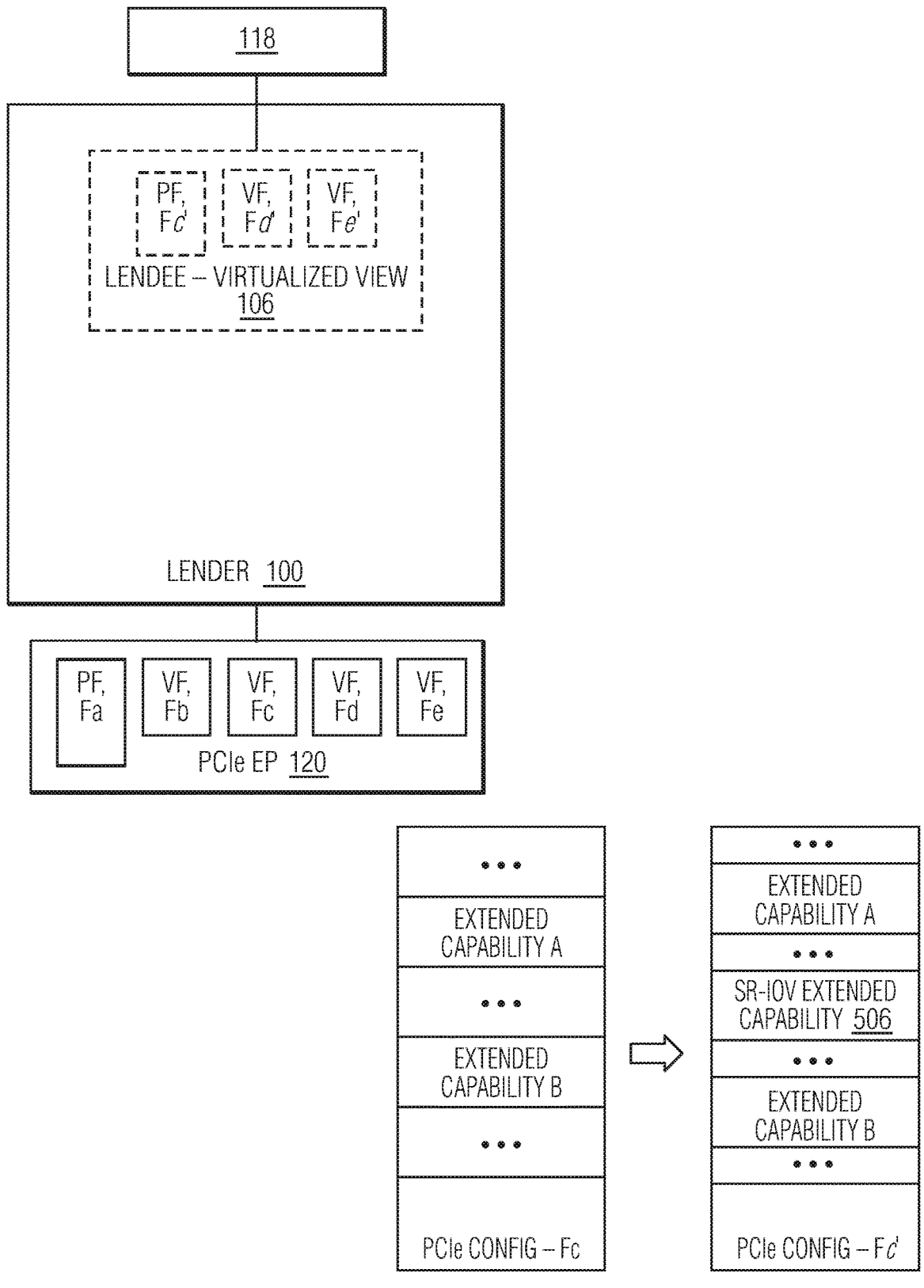
FIG. 5 illustrates another example of sharing a PCIe function in accordance with an embodiment.

FIG. 5 illustrates another example of sharing a PCIe function in accordance with an embodiment. The PCIe EP 110, 120 may be a multifunction PCIe device which implements an SR-IOV capability structure where Fa is a PF and one or more VFs such as 4 VFs (Fb-Fe) are associated with the PF Fa. In this example, the remote computer 118 may have access to 3 PCIe functions based on a configuration by the virtualization controller 106. All PCIe functions are mapped to VFs in the PCIe EP 110, 120 but presented as a PF+2 VFs to the remote computer 118 in a virtualization by the PCIe virtualization controller 106. The virtualization is presented by the PCIe virtualization controller 106 to the remote computer 118 during the enumeration process as a virtualized SR-IOV capability structure while other PCIe functions of the PCIe EP 110, 120 are reserved for other users. The virtualized view may include a virtualized SR-IOV capability structure where the Fc VF in the PCIe EP 110 is virtualized as a PF as shown as Fc', and two VFs is mapped to Fd, Fe VFs is associated with the virtualized PF in the PCIe EP 106, shown as Fd', Fe' in a virtualized SR-IOV capability structure defined by the PCIe virtualization controller 106. The PCIe virtualization controller 106 may also reconfigure a configuration space 502 of the PCIe function Fc which is a VF to a configuration space 504 associated with Fc' which is a virtualized PF. The reconfiguration may be performed when the computer 100 is configured to share the PCIe function with the remote computer 118. In an example, Fc is expected to support a number of capability structures, but as a VF, Fc cannot support SR-IOV extended capability structures related to Fd', Fe'. As a virtualized PF, Fc' may support SR-IOV extended capability structure. In an example, the extended capability structures in the configuration space 502 may need to be relocated to make space for SR-IOV extended capability structure 506 which is added in the configuration space 502. The PCIe virtualized controller 106 may store this updated configuration space 504. Further, the offset 308 may indicate where structures in the configuration space 502 are relocated in the configuration space 504 so that the remote computer 118 does not need to know where the relocated fields are and can indicate the offset 302 to access the fields irrespective of the relocation. In this way, when the PCIe virtualization controller 106 receives a configuration request associated with the PCIe function Fc'-Fe' the PCIe virtualization controller 106 may execute the read or write operation in the indicated field of the configuration space 504 associated with the PCIe function.

Example Apparatus

Figure 6:
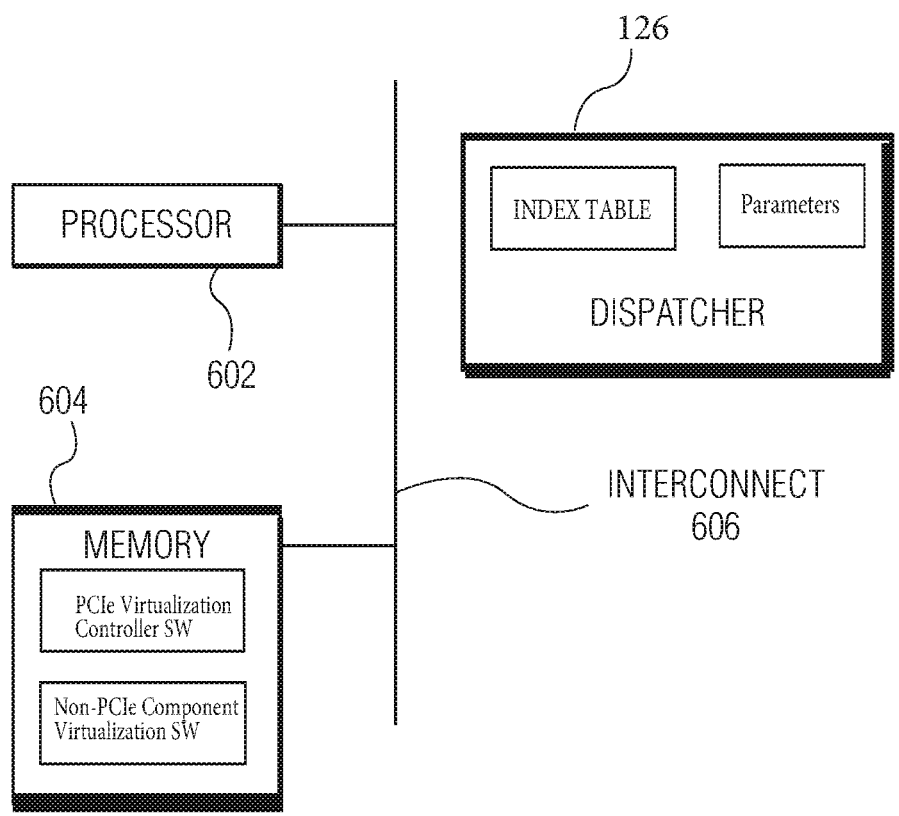
FIG. 6 is an example arrangement of the dispatcher and virtualization controllers in accordance with an embodiment.

FIG. 6 is an example arrangement of the dispatcher 126 and virtualization controllers 106, 154 in accordance with an embodiment. The dispatcher 126 may be coupled to a processor 602 (possibly including logic circuitry, hardware, multiple processors, multiple cores, multiple nodes, and/or implementing multi-threading, etc.) and memory 604 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium via an interconnect 606. Interconnect 606 such as a bus or NOC (e.g., Advanced extensible Interface) may facilitate communication between the processor 602, the memory 604, and the dispatcher 126. In an example, the interconnect 606 may be part of the communication fabric 114. In some examples, the memory 604 may store software (SW) such as computer code, program instructions, computer instructions, and program code executable by the processor 602 to implement functions of the PCIe virtualization controller 106 and non-PCIe component virtualization controller 154. Further, the dispatcher 126 may store preconfigured parameters of the configuration space of PCIe functions which are read-only values and which is provided back to the remote computer 118 in response to a read operation of a configuration request. In an example, the dispatcher 126 may be a subsystem of a computer 100 which is in communication via the communication fabric 114 with other subsystems which provide PCIe functionality. The dispatcher 126 may be implemented in hardware as shown or a combination of hardware and software. Further, the PCIe virtualization controller 106 and non-PCIe component virtualization controller 154 may be implemented in hardware rather than a combination of hardware and software.

Example Operation

Figure 7:
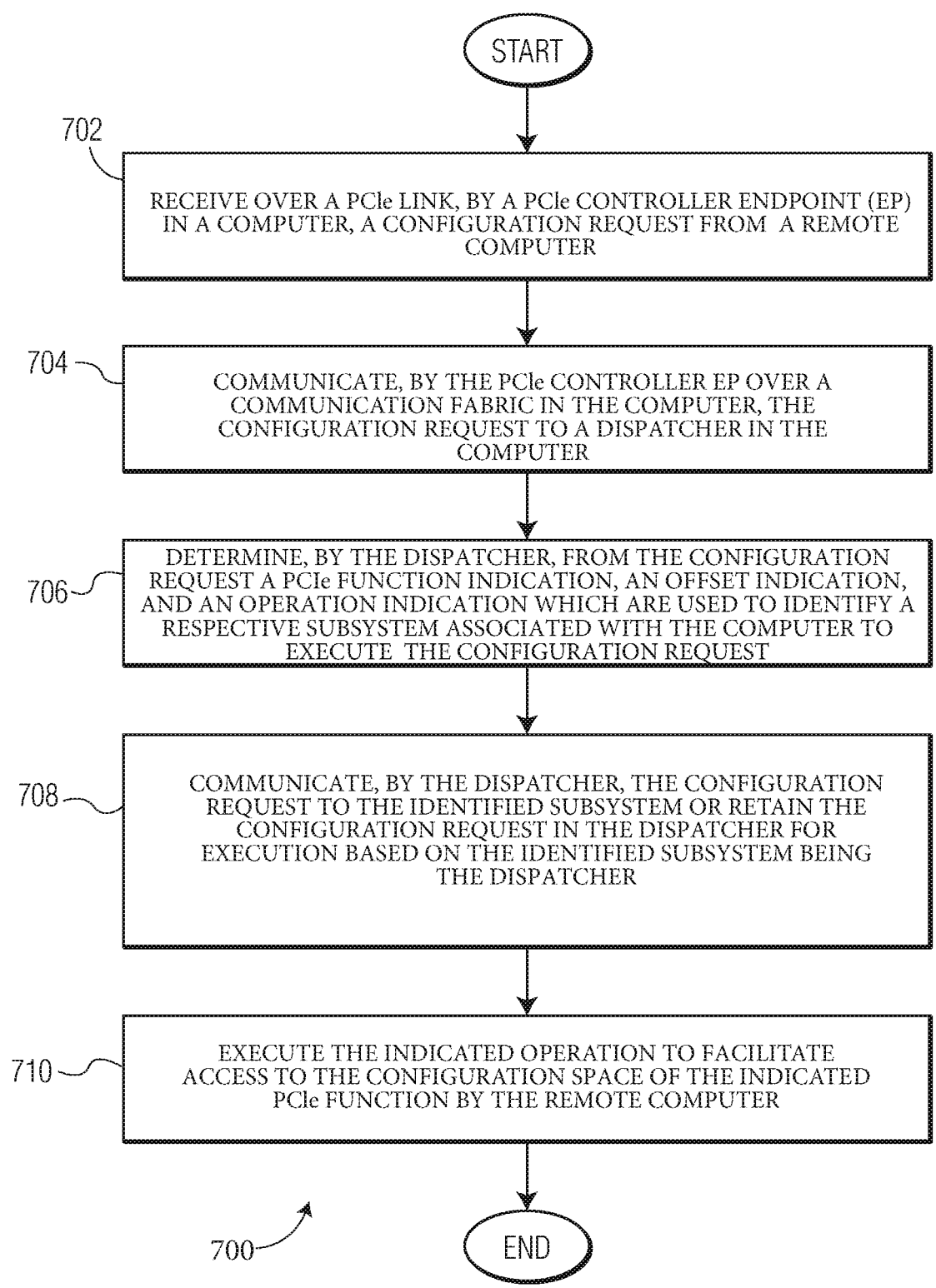
FIG. 7 is an example flow chart of functions associated with operation of the dispatcher in accordance with an embodiment.

FIG. 7 is an example flow chart 700 of functions associated with operation of the dispatcher 126 in accordance with an embodiment. At 702, a configuration request from a remote computer is received over a PCIe link by a PCIe controller EP in a computer. The configuration request may indicate an operation to perform in a configuration space of a PCIe function such as a read operation or a write operation. At 704, the PCIe controller EP communicates the configuration request via a communication fabric in the computer to the dispatcher. In an example, the PCIe controller EP may add an indication to the configuration request that allows the dispatcher to intercept the configuration request over the communication fabric. At 706, the dispatcher determines from the configuration request a PCIe function indication, an offset indication, and operation indication which are used to identify a respective subsystem associated with the computer to execute the configuration request. In an example, the dispatcher may use the index table 210, 300 to identify the respective subsystem. At 708, the dispatcher communicates the configuration request to the identified subsystem for execution or retains the configuration request in the dispatcher for execution. In an example, the dispatcher may add an indication to the configuration request that allows the identified subsystem which is not the dispatcher to receive the configuration request via the communication fabric. Further, in some examples, the dispatcher may also update the offset field 206 in the configuration request with the redirect offset 310 associated with the access in the configuration request as indicated by the table. At 710, the indicated operation is executed by a respective subsystem to facilitate access to the configuration space of the indicated PCIe function at the offset by the remote computer. A subsystem may then send a response to the execution to the remote computer 118. The response may indicate a parameter read or indication that a write operation was completed. If the dispatcher executes the configuration request, the dispatcher may store parameters associated with the configuration space which is associated with the operation. For instance, if the configuration request is a read operation, then the dispatcher may store the parameters of the configuration space which the dispatcher then sends to the remote computer 118 in a response to the configuration request rather than providing the configuration request to another subsystem which in turn sends the parameters to the remote computer 118.

In an embodiment, a method performed by a dispatcher which facilitates access to a configuration space of a PCIe function associated with the computer is disclosed. The method comprises: receiving, by the dispatcher, a configuration request from a remote computer to access the configuration space, the configuration request received via a PCIe controller EP of the computer over a PCIe link from a PCIe root complex of the remote computer; determining, by the dispatcher from the configuration request, a PCIe function and operation indicated in the configuration request; identifying a respective subsystem associated with the computer to the configuration request to based on the PCIe function and operation indicated in the configuration request; and communicating, by the dispatcher, the configuration request to the identified subsystem, wherein the identified subsystem executes the configuration request to facilitate access to the configuration space of the indicated PCIe function by the remote computer and sharing of the PCIe function with the remote computer. In an example, communicating the configuration request comprises communicating the configuration request to the PCIe controller EP based on the operation being a write operation in the configuration space, the configuration space associated with the PCIe link, wherein an indication is added to the configuration request that allows the configuration request to be communicated from the dispatcher to the PCIe controller EP via the communication fabric. In an example, communicating the configuration request comprises communicating the configuration request to a multi-function PCIe EP of the computer based on the operation being a write operation in the configuration space, the configuration space associated with the multi-function PCIe EP, wherein an indication is added to the configuration request that allows the configuration request to be communicated from the dispatcher to the PCIe EP via the communication fabric. In an example, communicating the configuration request comprises communicating the configuration request to a non-PCIe component virtualization controller based on the operation being read or write operation in the configuration space, the configuration space associated with a non-PCIe component in the computer, wherein an indication is added to the configuration request that allows the configuration request to be communicated from the dispatcher to the non-PCIe component virtualization controller via the communication fabric. In an example, identifying a respective subsystem comprises accessing an index table which maps the indication of the PCIe function and operation to an indication of the subsystem to communicate the configuration request. In an example, the operation is one of a read and write operation. In an example, a PCI function virtualization controller virtualizes a PCIe function of a single root I/O virtualization (SR-IOV) capability structure and the PCIe function identifies the virtualized PCIe function. In an example, identifying the respective subsystem comprises accessing an index table which maps an indication of the virtualized PCIe function and operation to an identification of the PCIe virtualization controller, wherein the configuration request is communicated to the PCIe virtualization controller for execution. In an example, an index table which maps the indication of the PCIe function and operation to the identification of the PCIe virtualization controller further indicates a redirect offset, an offset indicated in the configuration request being adjusted by the dispatcher by the redirect offset and the configuration request with the adjusted offset being communicated to the PCIe virtualization controller for execution to access the configuration space at the adjusted offset. In an example, the virtualized PCIe function is a virtual function of the SR-IOV capability structure virtualized as a PCIe physical function. In an example, the method further comprises executing, by the dispatcher, the configuration request based on the operation being a read operation of the configuration space of the PCIe function.

In another embodiment, a dispatcher to facilitate access to a configuration space of a PCIe function associated with the computer is disclosed. The dispatcher is arranged to: receive a configuration request from a remote computer to access the configuration space, the configuration request received via a PCIe controller EP of the computer over a PCIe link from a PCIe root complex of the remote computer and addressed to the dispatcher; determine from the configuration request a PCIe function and operation indicated in the configuration request; identify a respective subsystem associated with the computer to communicate the configuration request to based on the PCIe function and operation indicated in the configuration request; and communicate, by the dispatcher, the configuration request to the identified subsystem, wherein the identified subsystem executes the configuration request to facilitate access to the configuration space of the indicated PCIe function by the remote computer and sharing of the PCIe function with the remote computer. In an example, the dispatcher arranged to communicate the configuration request comprises the dispatcher arranged to communicate the configuration request to the PCIe controller EP based on the operation being a write operation in the configuration space, wherein an indication is added to the configuration request that allows the configuration request to be communicated from the dispatcher to the PCIe controller EP via the communication fabric. In an example, the dispatcher arranged to communicate the configuration request comprises the dispatcher arranged to communicate the configuration request to a multi-function PCIe EP of the computer based on the operation being a write operation in the configuration space, wherein an indication is added to the configuration request that allows the configuration request to be communicated by the dispatcher to the PCIe EP via the communication fabric. In an example, the dispatcher arranged to communicate the configuration request comprises the dispatcher arranged to communicate the configuration request to a non-PCIe component virtualization controller based on the operation being a write operation in the configuration space, wherein an indication is added to the configuration request that allows the configuration request to be communicated from the dispatcher to the non-PCIe component virtualization controller via the communication fabric. In an example, the dispatcher arranged to identify a respective subsystem comprises the dispatcher arranged to access an index table which maps indication of the PCIe function and operation to an identification of the subsystem to send the configuration request. In an example, a PCIe virtualization controller virtualizes a PCIe function of a single root I/O virtualization (SR-IOV) capability structure and the PCIe function indication identifies the virtualized PCIe function. In an example, the dispatcher arranged to identify the respective subsystem comprises the dispatcher arranged to access an index table which maps an indication of the virtualized PCIe function and the operation to an identification of the PCIe virtualization controller where the configuration request is communicated for execution. In an example, the index table which maps the indication of the PCIe function and operation to the identification of the PCIe virtualization controller further indicates a redirect offset, an offset indication in the configuration request being adjusted by the dispatcher by the indication of the redirect offset and the configuration request with the adjusted offset being communicated to the PCIe virtualization controller for execution to access the configuration space at the adjusted offset.

In yet another embodiment, a computer arranged to facilitate access to a configuration space of a PCIe function associated with the computer is disclosed. The computer comprises: a PCIe controller end point (EP); a dispatcher; a subsystem; a communication fabric which communicatively couples the PCIe controller, the dispatcher, and the subsystem; wherein the PCIe controller EP is arranged to receive over a PCIe link a configuration request from a PCIe root complex of a remote computer to access the configuration space; and send, by the PCIe controller EP, the configuration request to the dispatcher of the computer over the communication fabric; wherein the dispatcher is arranged to determine a PCIe function, an offset, and operation indicated in the configuration request; identify a respective subsystem associated with the computer based on the PCIe function and operation indicated in the configuration request; and communicate the configuration request to the identified subsystem; and wherein the identified subsystem is arranged to execute the indicated operation in response to the configuration request to facilitate access to the configuration space of the indicated PCIe function at the indicated offset by the remote computer and sharing of the PCIe function with the remote computer.

A few implementations have been described in detail above, and various modifications are possible. The disclosed subject matter, including the operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a computer to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed Other implementations fall within the scope of the following claims.

We claim:

1. A method performed by a dispatcher which facilitates access to a configuration space of a PCIe function associated with a computer, the method comprising:
    receiving, by the dispatcher, a configuration request from a remote computer to access the configuration space, the configuration request received via a PCIe controller EP of the computer over a PCIe link from a PCIe root complex of the remote computer;
    determining, by the dispatcher from the configuration request, a PCIe function and operation indicated in the configuration request;
    identifying a respective subsystem associated with the computer to communicate the configuration request to based on the PCIe function, an offset into the configuration space of the PCIe function, and an operation indicated in the configuration request; and
    communicating, by the dispatcher, the configuration request to the identified subsystem, wherein the identified subsystem executes the configuration request to facilitate access to the configuration space of the indicated PCIe function by the remote computer and sharing of the PCIe function with the remote computer, wherein the offset indicated in the configuration request is adjusted by the dispatcher by a redirect offset and the adjusted offset is communicated to the identified subsystem which accesses the configuration space at the adjusted offset to perform the operation indicated in the configuration request.

2. The method of claim 1, wherein communicating the configuration request comprises communicating the configuration request to the PCIe controller EP based on the operation being a write operation in the configuration space, the configuration space associated with the PCIe link, wherein an indication is added to the configuration request that allows the configuration request to be communicated from the dispatcher to the PCIe controller EP via the communication fabric.

3. The method of claim 1, wherein communicating the configuration request comprises communicating the configuration request to a multi-function PCIe EP of the computer based on the operation being a write operation in the configuration space, the configuration space associated with the multi-function PCIe EP, wherein an indication is added to the configuration request that allows the configuration request to be communicated from the dispatcher to the PCIe EP via the communication fabric.

4. The method of claim 1, wherein communicating the configuration request comprises communicating the configuration request to a non-PCIe component virtualization controller based on the operation being read or write operation in the configuration space, the configuration space associated with a non-PCIe component in the computer, wherein an indication is added to the configuration request that allows the configuration request to be communicated from the dispatcher to the non-PCIe component virtualization controller via the communication fabric.

5. The method of claim 1, wherein identifying the respective subsystem comprises accessing an index table which maps the indication of the PCIe function and operation to an indication of the subsystem to communicate the configuration request.

6. The method of claim 1, wherein the operation is one of a read and write operation.

7. The method of claim 1, wherein a PCI function virtualization controller virtualizes a PCIe function of a single root I/O virtualization (SR-IOV) capability structure and the PCIe function identifies the virtualized PCIe function.

8. The method of claim 7, wherein identifying the respective subsystem comprises accessing an index table which maps an indication of the virtualized PCIe function and operation to an identification of the PCIe virtualization controller, wherein the configuration request is communicated to the PCIe virtualization controller for execution.

9. The method of claim 8, wherein the index table which maps the indication of the PCIe function and operation to the identification of the PCIe virtualization controller further indicates the redirect offset, the offset indicated in the configuration request being adjusted by the dispatcher by the redirect offset and the configuration request with the adjusted offset being communicated to the PCIe virtualization controller for execution to access the configuration space at the adjusted offset.

10. The method of claim 9, wherein the virtualized PCIe function is a virtual function of the SR-IOV capability structure virtualized as a PCIe physical function.

11. The method of claim 1, further comprising executing, by the dispatcher, the configuration request based on the operation being a read operation of the configuration space of the PCIe function.

12. A dispatcher to facilitate access to a configuration space of a PCIe function associated with a computer, the dispatcher arranged to:
receive a configuration request from a remote computer to access the configuration space, the configuration request received via a PCIe controller EP of the computer over a PCIe link from a PCIe root complex of the remote computer and addressed to the dispatcher;
determine from the configuration request a PCIe function and operation indicated in the configuration request;
identify a respective subsystem associated with the computer to communicate the configuration request to based on the PCIe function, an offset into the configuration space of the PCIe function, and an operation indicated in the configuration request; and
communicate, by the dispatcher, the configuration request to the identified subsystem, wherein the identified subsystem executes the configuration request to facilitate access to the configuration space of the indicated PCIe function by the remote computer and sharing of the PCIe function with the remote computer, wherein the offset indicated in the configuration request is adjusted by the dispatcher by a redirect offset and the adjusted offset is communicated to the identified subsystem which accesses the configuration space at the adjusted offset to perform the operation indicated in the configuration request.

13. The dispatcher of claim 12, wherein the dispatcher arranged to communicate the configuration request comprises the dispatcher arranged to communicate the configuration request to the PCIe controller EP based on the operation being a write operation in the configuration space, wherein an indication is added to the configuration request that allows the configuration request to be communicated from the dispatcher to the PCIe controller EP via the communication fabric.

14. The dispatcher of claim 12, wherein the dispatcher arranged to communicate the configuration request comprises the dispatcher arranged to communicate the configuration request to a multi-function PCIe EP of the computer based on the operation being a write operation in the configuration space, wherein an indication is added to the configuration request that allows the configuration request to be communicated by the dispatcher to the PCIe EP via the communication fabric.

15. The dispatcher of claim 12, wherein the dispatcher arranged to communicate the configuration request comprises the dispatcher arranged to communicate the configuration request to a non-PCIe component virtualization controller based on the operation being a write operation in the configuration space, wherein an indication is added to the configuration request that allows the configuration request to be communicated from the dispatcher to the non-PCIe component virtualization controller via the communication fabric.

16. The dispatcher of claim 12, wherein the dispatcher arranged to identify a respective subsystem comprises the dispatcher arranged to access an index table which maps indication of the PCIe function and operation to an identification of the subsystem to send the configuration request.

17. The dispatcher of claim 12, wherein a PCIe virtualization controller virtualizes a PCIe function of a single root I/O virtualization (SR-IOV) capability structure and the PCIe function indication identifies the virtualized PCIe function.

18. The dispatcher of claim 17, wherein the dispatcher arranged to identify the respective subsystem comprises the dispatcher arranged to access an index table which maps an indication of the virtualized PCIe function and the operation to an identification of the PCIe virtualization controller where the configuration request is communicated for execution.

19. The dispatcher of claim 18, wherein the index table which maps the indication of the PCIe function and operation to the identification of the PCIe virtualization controller further indicates the redirect offset, the offset indication in the configuration request being adjusted by the dispatcher by the indication of the redirect offset and the configuration request with the adjusted offset being communicated to the PCIe virtualization controller for execution to access the configuration space at the adjusted offset.

20. A computer arranged to facilitate access to a configuration space of a PCIe function associated with the computer, the computer comprising:
a PCIe controller end point (EP);
a dispatcher;
a subsystem;
a communication fabric which communicatively couples the PCIe controller EP, the dispatcher, and the subsystem;
wherein the PCIe controller EP is arranged to receive over a PCIe link a configuration request from a PCIe root complex of a remote computer to access the configuration space; and send, by the PCIe controller EP, the configuration request to the dispatcher of the computer over the communication fabric;

wherein the dispatcher is arranged to determine a PCIe function, an offset into the configuration space of the PCIe function, and operation indicated in the configuration request; identify a respective subsystem associated with the computer based on the PCIe function and operation indicated in the configuration request; and communicate the configuration request to the identified subsystem; and wherein the identified subsystem is arranged to execute the indicated operation in response to the configuration request to facilitate access to the configuration space of the indicated PCIe function at the indicated offset by the remote computer and sharing of the PCIe function with the remote computer, wherein the offset indicated in the configuration request is adjusted by the dispatcher by a redirect offset and the adjusted offset is communicated to the identified subsystem which accesses the configuration space at the adjusted offset to perform the operation indicated in the configuration request.

21. The method of claim 1, wherein the PCIe function indicated in the configuration request is a virtual function presented as a physical function to the remote computer.

22. The dispatcher of claim 12, wherein the PCIe function indicated in the configuration request is a virtual function presented as a physical function to the remote computer.

* * * * *